(12) United States Patent
Chen

(10) Patent No.: US 7,301,760 B2
(45) Date of Patent: Nov. 27, 2007

(54) FLAT PANEL DISPLAY MODULE

(75) Inventor: Yung-Kun Chen, Tainan Hsien (TW)

(73) Assignee: Hannspree Inc., Taipei (TW)

( * ) Notice: Subject to any disclaimer, the term of this patent is extended or adjusted under 35 U.S.C. 154(b) by 268 days.

(21) Appl. No.: 11/247,368

(22) Filed: Oct. 11, 2005

(65) Prior Publication Data

US 2006/0285363 A1    Dec. 21, 2006

(30) Foreign Application Priority Data

Jun. 16, 2005    (TW) .............................. 94210185 U

(51) Int. Cl.
*G06F 1/16* (2006.01)
(52) U.S. Cl. ........................ 361/681; 248/917; 362/634
(58) Field of Classification Search ................ 362/634; 292/42, 148, 161; 248/917–919; 345/58–62; 361/679–687, 724–727

See application file for complete search history.

(56) References Cited

U.S. PATENT DOCUMENTS

| | | | |
|---|---|---|---|
| 5,168,429 A * | 12/1992 | Hosoi | 361/680 |
| 6,356,440 B2 * | 3/2002 | Selker | 361/683 |
| 7,002,792 B2 * | 2/2006 | Han et al. | 361/681 |
| 2006/0044746 A1 * | 3/2006 | Kim et al. | 361/681 |

* cited by examiner

*Primary Examiner*—Hung Van Duong
(74) *Attorney, Agent, or Firm*—Thomas, Kayden, Horstemeyer & Risley

(57) ABSTRACT

A flat panel display module. The flat panel display module includes a body, a cover device and a base. The body comprises an opening. The cover device is disposed on the body, corresponding to the opening, and is rotatable between a first position and a second position. The base is combined with the opening in a detachable manner. When the base is combined with the opening, the cover device is in the first position. When the base is detached from the opening, the cover device is in the second position, covering the opening.

8 Claims, 6 Drawing Sheets

FLAT PANEL DISPLAY MODULE

BACKGROUND

The invention relates to a flat panel display module, and in particular, to a flat panel display module using a rotatable cover device.

Referring to FIG. 1, a conventional flat panel display module 10 comprises a main body 11 and a base 12. The main body 11 has an opening 111. When the display module 10 is used on a surface, the base 12 is inserted into the opening 111.

Alternatively, the base 12 can be detached from the opening 111, such that the main body 11 can be mounted on a wall. Because the opening 111 connects the inside of the main body 11 to the external environment, electronic elements in the main body 11 are exposed if the opening 111 is not covered. As a result, not only can the external contaminants enter, but electrical discharge may occur.

In order to isolate electronic elements from the external environment, a conventional display module 10, as shown in FIG. 2, uses an accessory cap C to cover the opening 111. However, the accessory cap C is separate from the display module, easily lost, as well as requiring more complex assembly.

SUMMARY

Accordingly, the invention provides a flat panel display module comprising a body, a cover device and a base. The body has an opening. The cover device is disposed on the body, corresponded to the opening, and is rotatable between a first position and a second position. The base is detachably combined with the opening. When the base is aligned with the opening, the cover device is in the first position. When the base is separated from the opening, the cover device is in the second position, covering the opening.

The opening is disposed at the bottom of the body.

The cover device comprises a cover member and an elastic member. The cover member is rotatable on the body between the first position and the second position. The elastic member is disposed on the body, abutting the cover member, providing resilient force to return the cover member to the second position. In addition, the elastic member is a spring.

The cover member is disposed near one side of the opening.

The cover device comprises a cover member and an elastic member. The cover member is rotatable on the body between the first position and the second position. The elastic member is disposed on the cover member, abutting the body, providing resilient force to return the cover member to the second position.

DESCRIPTION OF THE DRAWINGS

The present invention can be more fully understood by reading the subsequent detailed description and examples with references made to the accompanying drawings, wherein.

DETAILED DESCRIPTION

Figure 1:
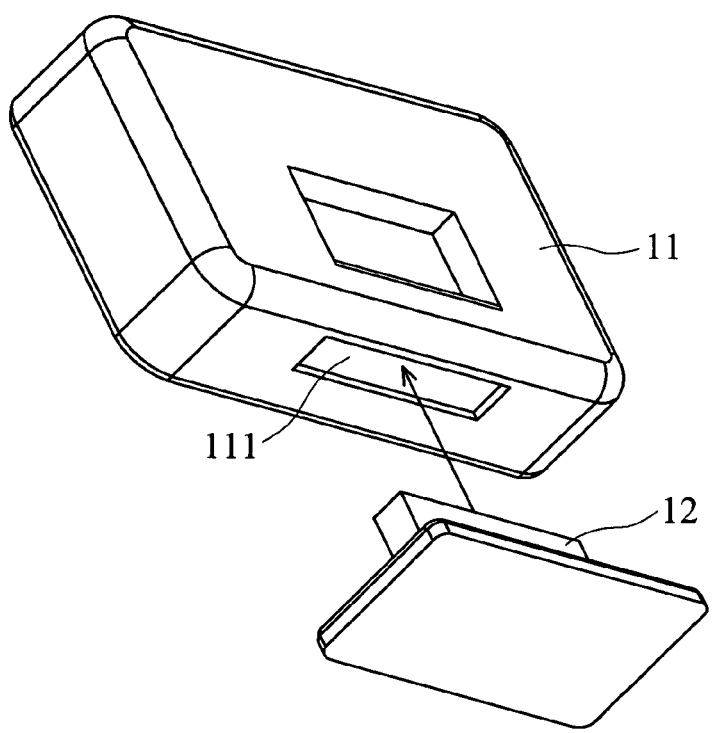
FIG. 1 is a schematic view of a conventional flat panel display module.
Figure 2:
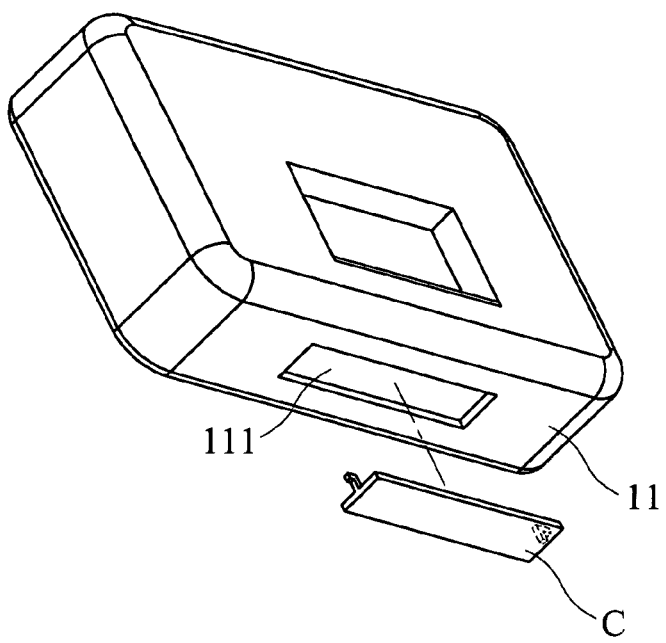
FIG. 2 is a schematic view of the conventional flat panel display module without a base.
Figure 3A:
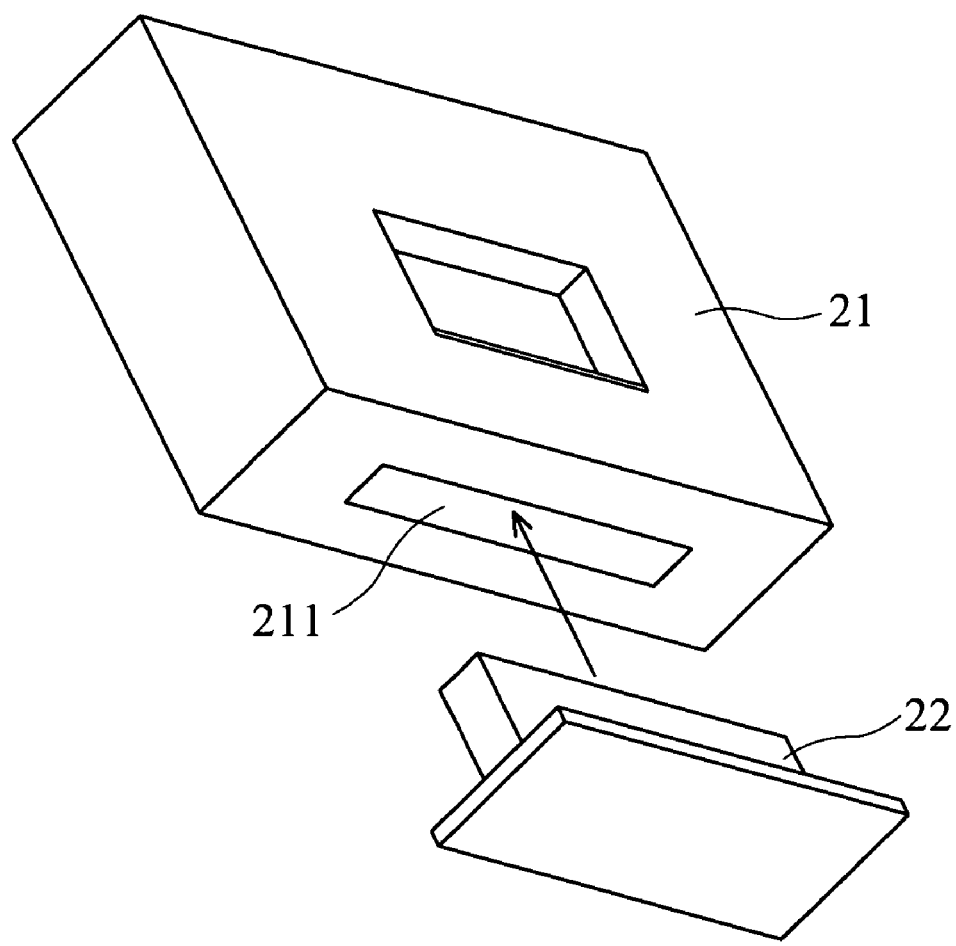
FIG. 3a is a schematic view of a flat panel display module of the invention.
Figure 3B:
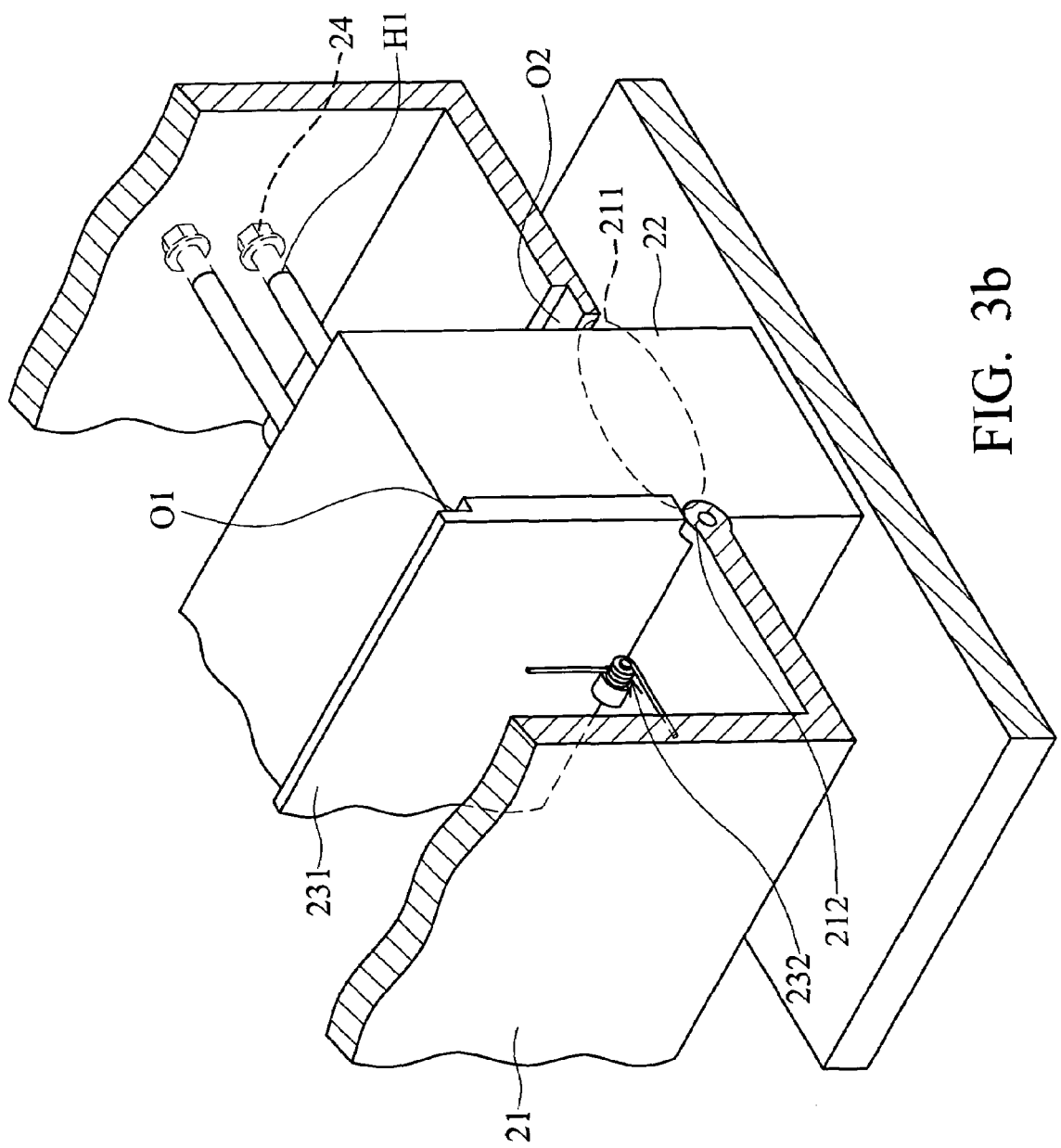
FIG. 3b is a perspective sectional view of the flat panel display module of the invention.
Figure 4:
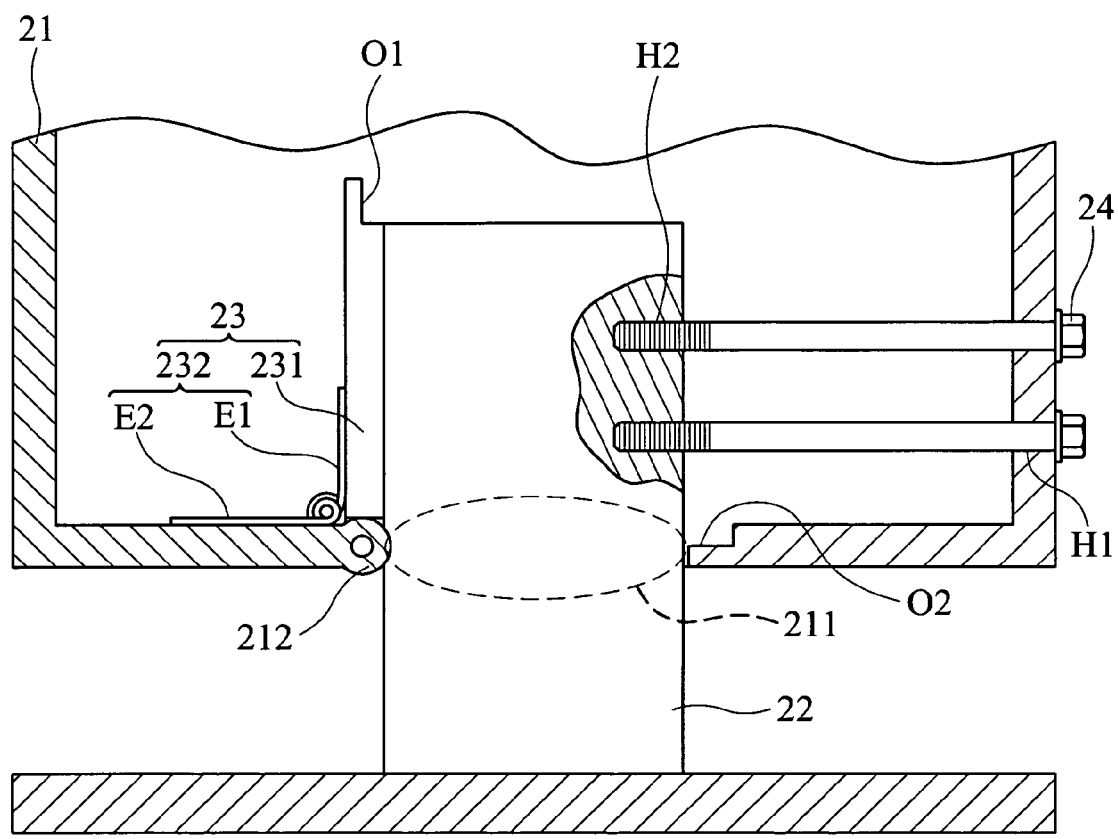
FIG. 4 is a sectional view of the flat panel display module of the invention without a base.
Figure 5:
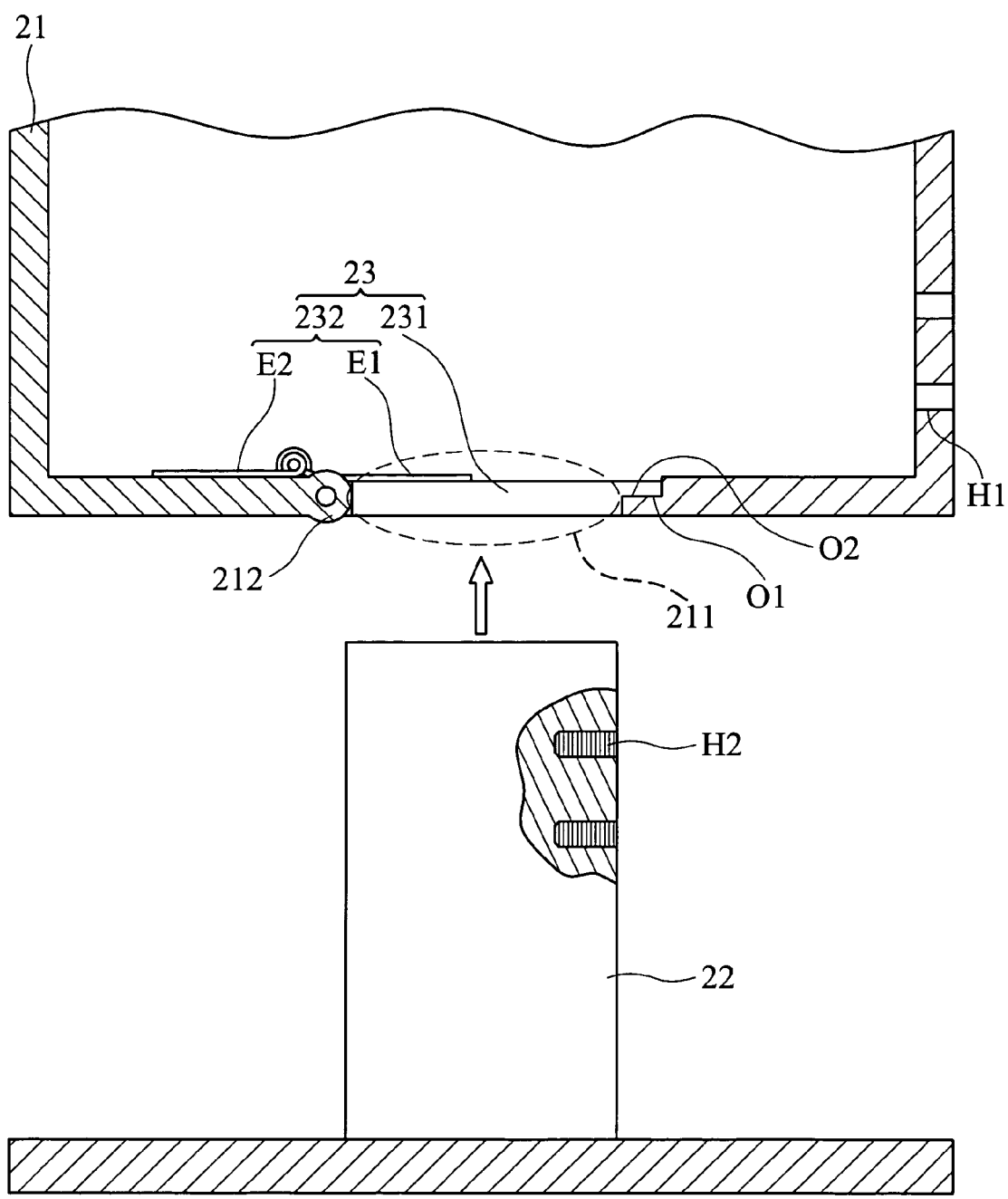
FIG. 5 is a sectional view of an embodiment of the flat panel display module of the invention.

FIGS. 3a and 3b depict a flat panel display module 20 of the invention. FIGS. 4 and 5 are sectional views of the flat panel display 20 of the invention. The flat panel display module 20 comprises a body 21, a base 22, a cover device 23, and a locking member 24. The body 21 has an opening 211, a rotating portion 212, and a plurality of through holes H1. The rotating portion 212 is disposed on the circumference of the opening 211. The base 22 is detachably disposed in the opening 211, and comprises a plurality of mounting holes H2- corresponding to the through holes H1.

The cover device 23 comprises a cover member 231 and an elastic member 232. The cover member 231 is the same size as the opening 211, and one side of the cover member 231 pivots on the rotating portion 212 between an open position (a first position, as shown in FIG. 3b) and a closed position (a second position, as shown in FIG. 5). Another side of the cover member 231 forms a step O1 while one side of the opening 211 forms a step O2 corresponding to the step O1 of the cover member 231. The steps O1 and O2 abut each other to limit the rotation of the cover member 231.

The elastic member 232 is a torsion spring, disposed on the rotating portion 212, having a first end E1 and a second end E2. The second end E2 abuts the body 21, and the first end E1 abuts the cover member 231. Alternatively, the elastic member 232 can also be disposed on the cover member 231, wherein the second end E2 abuts the body 21, and the first end E1 abuts the cover member 231.

It should be noted that while the elastic member 232 is a torsion spring, it is not limited thereto, and may be another type of spring, assembled in other ways in the flat panel display module. Similarly, the number of the elastic members 232 is not limited to one.

As shown in FIG. 4, when the base 22 combines with the opening 211, a front end of the base 22 pushes the cover member 231 into the interior of the body 21 until one surface of the cover member 231 becomes parallel to and abuts the base 22. The cover member 231 is in the first (open) position.

As the locking member 24 penetrates the through hole H1, into the mounting hole H2, the base 22 is fixed to the body 21. The number of the locking members 24 is not limited, but is the same as the number of the mounting holes H2.

As shown in FIG. 5, when the locking member 24 is withdrawn from the mounting hole H2, the base 22 exits the body 21 and detaches from the opening 211. Torsion in the elastic member 232 is released with the movement of the base 22. The first end El and the second end E2 of the elastic member 232 move in opposite directions, moving the cover member 231 toward the exterior of the body 21, until the step O1 abuts the step O2 of the body 21, and the opening 211 is entirely covered. The cover member 231 is in the second (closed) position.

Figure 6:
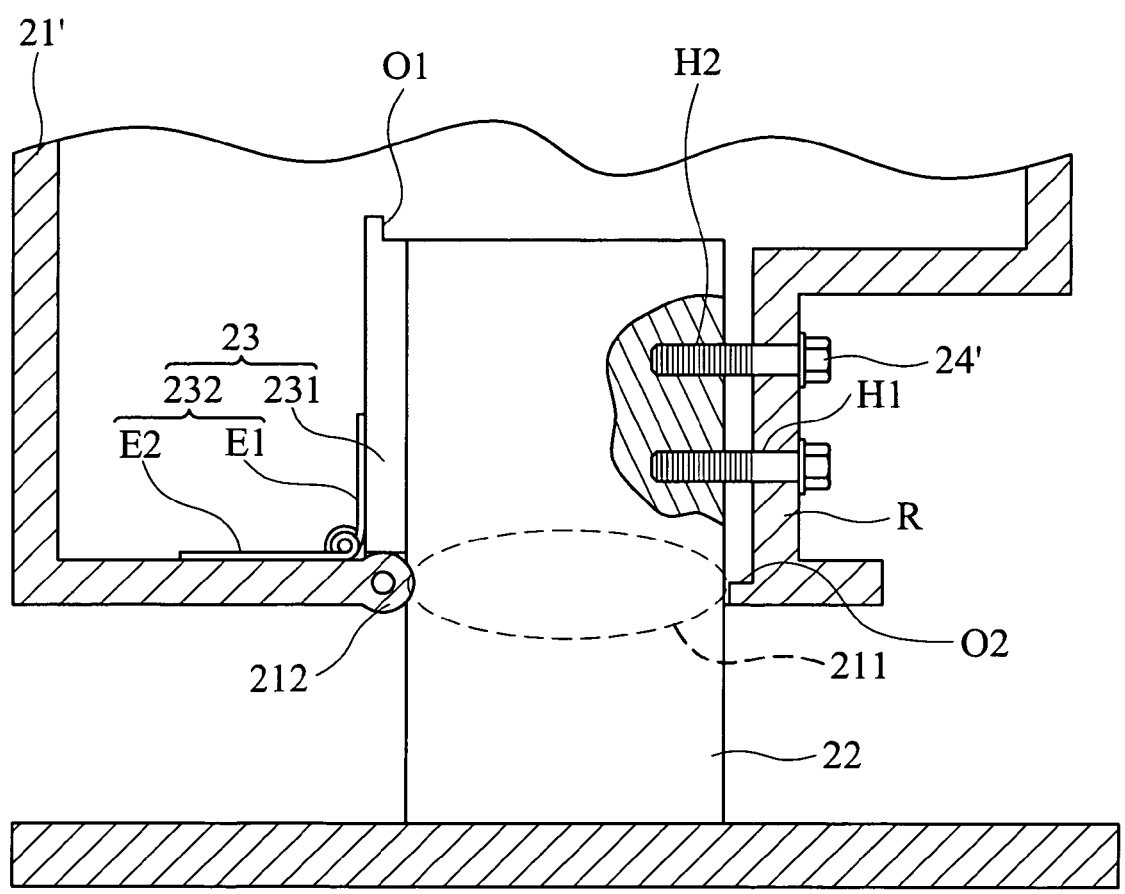
FIG. 6 is a sectional view of another embodiment of the flat panel display module of the invention.

FIG. 6 depicts another embodiment of the flat panel display module 20' of the invention. The body 21' comprises a depression R. When the base 22 is disposed in the opening 211, while abutting the surface of the cover member 231, the base 22 further abuts an inner surface of the depression R, such that distance between the through hole H1 and the mounting hole H2 decreases, as does the length of the locking member 24'. After penetrating the through hole Hi, the locking member 24' directly enters the mounting hole H2 to enhance overall structural strength.

The flat panel display module 20, 20' of the invention provides the cover device 23 directly on the body 21, 21'. When the base 22 is detached from the body 21, 21', utilizing the elasticity of the elastic member 232, the cover member 231 automatically covers the opening 211. No separate accessory cap is required to cover the opening 211, minimizing the number of required and reducing cost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat panel display module comprising:
   a body comprising an opening;
   a cover device disposed on the body, corresponding to the opening, rotating between a first position and a second position; and
   a base combined with the opening in a detachable manner;
   wherein when the base is combined with the opening, the cover device is in the first position, and when the base is detached from the opening, the cover device is in the second position, covering the opening.

2. The flat panel display module as claimed in claim 1, wherein the opening is disposed at the bottom of the body.

3. The flat panel display module as claimed in claim 1, wherein the cover device comprises:
   a cover member, rotatable on the body between the first position and the second position; and
   an elastic member, disposed on the body, abutting the cover member, providing resilient force to return the cover member to the second position.

4. The flat panel display module as claimed in claim 3, wherein the cover member is disposed near one side of the opening.

5. The flat panel display module as claimed in claim 3, wherein the elastic member is a spring.

6. The flat panel display module as claimed in claim 1, wherein the cover device comprises:
   a cover member, rotatable on the body between the first position and the second position; and
   an elastic member, disposed on the cover member, abutting the body, providing resilient force to return the cover member to the second position.

7. The flat panel display module as claimed in claim 6, wherein the cover member is disposed near one side of the opening.

8. The flat panel display module as claimed in claim 6, wherein the elastic member is a spring.

* * * * *